United States Patent Office 3,489,594
Patented Jan. 13, 1970

3,489,594
INSOLE MATERIAL HAVING CONTROLLED SLIPPAGE CHARACTERISTICS AND METHOD OF MAKING SAME
William Turkewitsch, Toronto, Ontario, Canada, assignor to The Scholl Mfg. Co., Inc., Chicago, Ill., a corporation of New York
No Drawing. Filed Feb. 13, 1967, Ser. No. 615,379
Int. Cl. C08d 13/24; B44d 1/14; B32b 5/18
U.S. Cl. 117—72                                    10 Claims

ABSTRACT OF THE DISCLOSURE

Insole compositions having a synthetic resin foam base impregnated with a thermoplastic resin and having a cover layer of a thermoplastic resin heat sealed thereto, the ratio of plasticizer to resin in both the impregnant and in the cover sheet being controlled to provide conrtolled sliding resistance at the underside of the foam and at the top of the cover layer.

BACKGROUND OF THE INVENTION

Field of the invention

The present invention is in the field of insoles for insertion into a shoe to provide a cushioning effect. For many years, such insoles were composed of a split sheet of foam rubber which was cemented in sheet form to a fabric and die cut. Later, foam rubber insoles were made by pouring foamed latex compositions onto fabric, curing, and die cutting. Recently, heat sealable foams have been used by providing the same with a wear-resistant surface in the form of a cover sheet which was heat sealed to the underlying foam. Such foam compositions were expensive and were otherwise not entirely suitable for this use.

One of the problems of manufacturing an insole to which apparently no attention has previously been paid is a matching of the sliding characteristics of the bottom surface of the foam which contacts the sock liner in the shoe, and the upper surface or the cover layer which contacts the stocking of the wearer. Obviously, the slide resistance of the stockinged foot to the wear-resistant cover layer must be smaller than the slide resistance of the heat sealable foam to the sock liner, otherwise the insole would slide forward when the foot is inserted into the shoe, and the insole may slip during use. Little has been done in attempting to adjust the slide resistance of the two surfaces of the insole, and some products in the market today are quite deficient in the respect.

Polyurehtane foams would provide an almost ideal cushioning material for use in insoles because of their relatively low cost and inertness. Such foams, however, are heat sealable only with great difficulty so that it is difficult to apply a suitable cover layer over these foams. Such foams can, however, be made more readily heat sealable by impergnating them with thermoplastic resin compositions such as polyvinyl chloride plastisols as described in U.S. Patent No. 3,061,460 to Erich Schickedanz. With the type of foam described in that patent, the thermoplastic cover layer can be readily applied by electronic sealing to provide a wear-resistant surface. The outer surface of the laminate often has a leather-like grain and touch which is quite satisfactory for many applications in the automotive and furniture fields. However, these same laminates are not satisfactory to a desirable extent as insole materials.

Description of the prior art

The prior art, to my knowledge, has not concerned itself with adjusting the slippage characteristics of synthetic resin foam lamintes in the manufacture of insoles. While heat sealable foams have been provided with a cover layer of thermoplastic material utilizing the impregnated foam of the Schickedanz patent referred to previously, there has been no teaching as to how the composition of the foam impregnant and the cover sheet could be modified to provide suitable slippage characteristics.

SUMMARY OF THE INVENTION

In accordance with the present invention, I provide insole compositions of controlled slippage characteristics by adjusting the relative amount of resin and plasticizer in both the impregnated foam and in the thermoplastic cover layer used as a wear-resistant surface over the foam. The cover layer may be a preformed sheet but preferably is applied to the foam as a paste which is simultaneously fused and bonded to the foam. Specifically, I have found that when the synthetic resinous foam is impregnated with a thermoplastic resinous composition containing from 50 to 60% by weight plasticizer, and the cover layer which is applied thereto contains from about 30 to 35% by weight plasticizer, the resulting laminate has excellent slippage characteristics. I have also found that the fusion temperatures employed for gelling the impregnant in the foam and the cover layer should also be controlled for best results, and should preferably be in the range from about 155° to 165° C. for the foam and 160° to 170° C. for the cover layer.

DESCRIPTION OF THE PREFERRED EMBODIMENTS

The cushioning foam of the present invention should be an open celled synthetic resin foam which is relatively inert. Polyurethane foams of either the ester or ether types are particularly preferred because they have all of the properties desired in insole compositions and are relatively inexpensive.

The thermoplastic impregnant for the foam is preferably of the type described in the aforementioned Schickedanz Patent No. 3,061,460, namely, a plastisol of polyvinyl chloride and/or polyvinyl acetate containing a suitable plasticizer or mixture of plasticizers. The optimum amount of impregnant for the foam is at a value of about 6.3 to 7.7 pounds of impregnant per cubic foot of uncompressed foam.

The plasticizer in the plastisol impregnant can be any of the commonly used plasticizers heretofore used in this type of composition. Typical plasticizers include phthalic acid esters, adipates, sebacic acid, azelaic acid esters, and the epoxy type esters. These various plasticizers have different solvating power with respect to the resinous constituent and varying degrees of migratory properties depending on their molecular size. Secondary plasticizers can also be added such as halogenated hydrocarbons and commercially available non-migratory polymeric polyesters. The amount of plasticizer in the impregnant should be controlled, as previously mentioned to the range of about 50 to 60% by weight of the total impregnant, with the optimum characteristics being achieved at a plasticizer concentration of about 52 to 55% by weight.

The cover layer is also preferably composed of a thermoplastic plastisol which contains from about 57 to 65% by weight of the thermoplastic resin, and from 30 to 35% by weight of plasticizer, with the balance, if any, being fillers, stabilizers or pigments. The plasticizers, of course, can be of the same type used in the impregnant for the foam.

Tests of sliding resistance were made in the following way. A toboggan-shaped aluminum plate measuring 1½ inches by 4 inches by 1/16 inch thickness was cushioned with a piece of adhesive foam. This assembly was then covered with nylon hosiery (15 denier, 400 needle). This nylon covered toboggan was pulled at a speed of 24 inches per minute over the top of the sample being tested, while the toboggan contained loads of 500 grams, 1 kilogram and 2 kilograms. The force required to pull the nylon covered plate over the surface was measured on a tensile strength tester.

For testing the sliding resistance of the foam to the sock liner, the insole product was attached beneath the toboggan and pulled over a standard sock liner, reading the force required with loads of 500 grams, 1 kilogram, and 2 kilograms on the toboggan.

The results were expressed at the ratio of the slide resistance of the nylon covered plate to the top of the insole, to the sliding resistance of the foam to the sock liner. Under these conditions, it was found that the ratio of 1 to 1.3 represents a minimum ratio for use as an insole, and that a ratio of 1 to 2.0 or 1 to 2.75 makes a very acceptable product.

The following specific examples illustrate the process involved more completely.

Example I.—The impregnant used with an open celled polyurethane foam had the following compositions:

| | Percent |
|---|---|
| Polyvinyl chloride powder 300 mesh ("Goodrich 121") | 33.3 |
| Dioctyl phthalate | 21.5 |
| Polymeric ester plasticizer ("Plastolein") | 21.6 |
| Epoxy plasticizer ("Drapez 4,4") | 4.7 |
| Alkyd type polyester plasticizer ("Paraplex G60") | 4.7 |
| Talc | 3.2 |
| Calcium carbonate | 10.0 |
| Barium-cadmium-zinc stabilizers | 1.0 |
| | 100.0 |

The polyurethane foam was impregnated with this dispersion and heated to a fusion temperature of about 160° C. Prolonged exposure to higher temperatures has been found to reduce the sliding resistance, presumably because of a loss of plasticizers by evaporation.

The wear-resistant cover sheet was composed of the following composition:

| | Percent |
|---|---|
| Polyvinyl chloride powder ("Goodrich 121") | 59.5 |
| Dioctyl phthalate | 13.0 |
| Butyl benzyl phthalate | 13.0 |
| Polymeric ester plasticizer | 4.0 |
| Epoxy plasticizer | 2.5 |
| Talc | 3.5 |
| Calcium carbonate plus pigment | 3.5 |
| Stabilizer | 1.0 |
| | 100.0 |

The plastisol was applied in paste form to the impregnated foam and fused into a bonded cover layer for the foam at a temperature of about 165° C. When tested as an insole under the conditions mentioned previously, the ratio of the sliding resistance at the top of the insole to the sliding resistance of the foam to the sock liner was on the order of 1 to 3. This provided excellent sliding characteristics in use.

Example II.—The polyurethane foam was impregnated with the same type of plastisol composition as in Example I, but the cover layer was made from the following formulation:

| | Percent |
|---|---|
| Polyvinyl chloride powder | 40.0 |
| Vinyl-vinylidene copolymer resin | 20.0 |
| Dioctyl phthalate | 12.5 |
| Butyl benzyl phthalate | 13.0 |
| Polymeric ester plasticizer | 4.0 |
| Epoxy plasticizer | 2.5 |
| Calcium carbonate | 3.5 |
| Talc | 3.5 |
| Stabilizer | 1.0 |
| | 100.0 |

When the cover sheet was electronically sealed to the impregnated foam, a ratio of sliding resistance of foam to sliding resistance at the top of the insole was on the order of 2.5.

There are numerous variations possible in manufacturing the products of the present invention. For example, the plastisol of the cover layer can be applied cold, or in the pre-gelled state. The impregnant in the foam can be fused before the unfused cover layer is applied, or both can be fused after application of the cover layer.

It should be evident that various other modifications can be made to the described embodiment without departing from the scope of the present invention.

I claim as my invention:

1. An insole material having controlled slippage characteristics comprising a base of a synthetic resinous foam impregnated with a thermoplastic resinous composition containing from 50 to 60% by weight plasticizer, and having heat sealed thereto a cover layer of a fused thermoplastic plastisol containing from 57 to 65% by weight thermoplastic resin, and from 30 to 35% by weight plasticizer.

2. The material of claim 1 in which said resinous foam is a polyurethane foam.

3. The material of claim 1 in which said thermoplastic resinous composition is a polyvinyl chloride plastisol.

4. The material of claim 3 in which the impregnated foam contains from 6.3 to 7.7 pounds of said thermoplastic resinous composition per cubic foot of foam.

5. An insole material having controlled slippage characteristics comprising a base of polyurethane foam impregnated with a fused polyvinyl chloride plastisol, said base containing from 6.3 to 7.7 pounds of said plastisol per cubic foot of foam, and said plastisol containing from 50 to 60% by weight plasticizer, said base having heat sealed thereto a cover layer of a fused polyvinyl chloride plastisol containing from 57 to 65% by weight polyvinyl chloride resin and from 30 to 35% by weight plasticizer.

6. The method of making an insole material having controlled slippage characteristics which comprises impregnating a polyurethane foam with a polyvinyl chloride plastisol containing from 50 to 60% by weight plasticizer, applying a polyvinyl chloride plastisol onto the foam, said last named plastisol containing from 30 to 35% by weight plasticizer, and thereafter bonding said last named plastisol to said impregnated foam.

7. The method of claim 6 in which the impregnated foam contains from 6.3 to 7.7 pounds of the polyvinyl chloride plastisol per cubic foot of foam.

8. The method of claim 6 in which the impregnant is fused in the foam at a temperature of about 155 to 165° C.

9. The method of claim 6 in which said last named plastisol is applied as a paste over said impregnated foam and is subsequently fused to form a cover layer for said foam.

10. The method of claim 6 in which said last named plastisol is applied as a preformed sheet over the impregnated foam.

References Cited

UNITED STATES PATENTS

| | | |
|---|---|---|
| 3,061,460 | 10/1962 | Schickedanz. |
| 3,268,355 | 8/1966 | Brodeur. |
| 3,360,415 | 12/1967 | Hellman et al. ____ 117—98 X |
| 3,393,119 | 7/1968 | Dugan _____ 117—98 X |

WILLIAM D. MARTIN, Primary Examiner

R. HUSACK, Assistant Examiner

U.S. Cl. X.R.

117—98, 138.8; 161—160